United States Patent
Payne et al.

(10) Patent No.: US 7,391,781 B2
(45) Date of Patent: Jun. 24, 2008

(54) PROVIDING A CORRECTED DELIVERY ADDRESS

(75) Inventors: David J. Payne, Collierville, TN (US); Robert F. Snapp, Memphis, TN (US); James D. Wilson, Collierville, TN (US)

(73) Assignee: United States Postal Service, Washington, DC (US)

( * ) Notice: Subject to any disclaimer, the term of this patent is extended or adjusted under 35 U.S.C. 154(b) by 762 days.

(21) Appl. No.: 10/665,456

(22) Filed: Sep. 18, 2003

(65) Prior Publication Data

US 2004/0177305 A1 Sep. 9, 2004

Related U.S. Application Data

(60) Provisional application No. 60/412,030, filed on Sep. 20, 2002.

(51) Int. Cl.
*H04L 12/28* (2006.01)
*H04L 12/56* (2006.01)
*G06Q 10/00* (2006.01)

(52) U.S. Cl. ............................. 370/396; 370/392; 705/1; 714/746

(58) Field of Classification Search ......... 370/392–402; 705/10–13, 401–410; 707/101–104
See application file for complete search history.

(56) References Cited

U.S. PATENT DOCUMENTS

| | | | | |
|---|---|---|---|---|
| 5,422,821 | A | * | 6/1995 | Allen et al. ............... 700/219 |
| 6,092,074 | A |   | 7/2000 | Rodkin et al. ............. 707/102 |
| 6,101,496 | A | * | 8/2000 | Esposito ..................... 707/6 |
| 6,400,715 | B1 | * | 6/2002 | Beaudoin et al. .......... 370/392 |
| 6,457,012 | B1 | * | 9/2002 | Jatkowski ................. 707/101 |
| 6,549,892 | B1 | * | 4/2003 | Sansone ................... 705/401 |
| 6,711,555 | B1 | * | 3/2004 | Sanders .................... 705/406 |
| 7,031,959 | B2 | * | 4/2006 | Garner et al. .............. 707/3 |
| 2002/0103932 | A1 |   | 8/2002 | Bilbrey et al. |
| 2004/0133443 | A1 | * | 7/2004 | Payne et al. ................ 705/1 |

(Continued)

FOREIGN PATENT DOCUMENTS

WO    WO 02/41186 A1    5/2002

OTHER PUBLICATIONS

International Search Report for PCT/US03/29554, mailed Apr. 8, 2004.

(Continued)

*Primary Examiner*—Man U. Phan
(74) *Attorney, Agent, or Firm*—Finnegan Henderson Farabow Garrett & Dunner, L.L.P.

(57) ABSTRACT

Providing a corrected delivery address comprises receiving a plurality of first data elements, each of the plurality of first data elements comprising a first portion and a second portion. Next providing a corrected delivery address comprises providing a second data element, the second data element corresponding to one of the plurality of first data elements and comprising a corrected version of the second portion of the corresponding first data element. Then providing a corrected delivery address comprises receiving an indication that none of the second portions of the plurality of first data elements match the second data element and providing, in response to the indication, a link associating the second data element with the first data element corresponding to the second data element.

48 Claims, 5 Drawing Sheets

U.S. PATENT DOCUMENTS

2005/0251285 A1* 11/2005 Boyce et al. .............. 700/226
2007/0088749 A1* 4/2007 Lorch et al. .............. 707/104.1

OTHER PUBLICATIONS

Magazine for Magazine Management, "NCOA Cleans Up Its Act; address-correction service expands database and offers nixie feature—but will publishers respond: (National change of Address, nixie mail that can't be delivered because of incorrect or nonexistent address)," Nov. 1987, vol. 16, No. 11, p. 52.

M2 Presswire, "Royal Mail's Postcode Address File Available On Infobank," Feb. 24, 1995.

Office Solutions, "Direct Addressing System for Midvolume Mailers. (Product Announcement)," Nov. 2000, vol. 17, No. 11, p. 46.

Anchor Computer "NCOA"; archived by Internet Archive: WayBack Machine on Sep. 6, 2001, and downloaded Mar. 27, 2007, http://web.archive.org/web/20010906224040/www.anchorcomputer.com/Services/ncoa_description.asp.

* cited by examiner

| | | 510 |
|---|---|---|
| 515 | 520 | |
| s229999912341s<br>Michael Murphy<br>5899 Plum Valley Dr<br>Memphis TN 38141-6826<br>s381416826991s | 22-99999-1234 38141-6826-99 | ⎫<br>⎬ Plurality of<br>⎭ First Data<br>    Elements |
| S22999912341s<br>Paul Bakshi<br>1400 Monroe St<br>Potomac MD 20854-2984<br>s2085429848s | 22-99999-1234 20854-2984-00 | |

FIG. 5

Mailer's Unknown Delivery Point Scans Table
| 38017-6836-54-9 |
|---|

FIG. 6   605

Old Address:                    New Address:
| Michael Murphy<br>5899 Plum Valley Dr<br>Memphis TN 38141-6826 | 1254 Sugar Ln<br>Collierville TN 38017-6836 |
|---|---|

Old address delivery point:      New address delivery point:
| 38141-6826-99-1 | 38017-6836-54-9 |
|---|---|

805    FIG. 8    810

PROVIDING A CORRECTED DELIVERY ADDRESS

RELATED APPLICATIONS

Under provisions of 35 U.S.C. § 119(e), Applicant claims the benefit of U.S. provisional application No. 60/412,030, filed Sep. 20, 2002, which is incorporated herein by reference.

TECHNICAL FIELD

The present invention relates to the field of providing corrected data. More particularly, the present invention, in various specific embodiments, involves methods and systems for providing a corrected delivery address.

BACKGROUND

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages. In the context of electronic commerce, an item sender may desire, for example, to receive corrected delivery address data.

Therefore, the need to efficiently provide corrected delivery address data remotely has become a common need for the United States Postal Service and many other organizations. More specifically, efficiently providing corrected delivery address data limited to only those recipients to whom the sender has an interest has become a critical service for many delivery system operators. This is because in an increasingly competitive environment, meeting and exceeding the expectations of those who receive a service is essential for a service provider.

One solution, for example, to the corrected delivery address data problem is for the item delivery system operator to allow an item sender access to the item delivery system's address database. In this situation, the sender would have unfettered access to all data, even data unrelated to a recipient that the sender wishes to send an item. This solution would at least have the potential of breaching the privacy of those listed in the item delivery system's address database.

Great inefficiencies are created in this procedure because, for example, providing corrected delivery address data limited only to data that the sender has an interest in sending an item is not possible. Accordingly, efficiently providing corrected delivery address data remains an elusive goal. Thus, there remains a need for efficiently providing corrected delivery address data. In addition, there remains a need for efficiently providing corrected delivery address data for a recipient that the sender has a direct interest in sending an item.

SUMMARY OF THE INVENTION

Consistent with the current invention, a corrected delivery address method and system are provided that avoid the problems associated with prior corrected delivery address methods and systems as discussed herein above.

In one aspect, a method for providing corrected data comprises receiving a plurality of first data elements, each of the plurality of first data elements comprising a first portion and a second portion, providing a second data element, the second data element corresponding to one of the plurality of first data elements and comprising a corrected version of the second portion of the corresponding first data element, receiving an indication that none of the second portions of the plurality of first data elements match the second data element, and providing, in response to the indication, a link associating the second data element with the first data element corresponding to the second data element.

In another aspect, a system for providing corrected data comprises a component for receiving a plurality of first data elements, each of the plurality of first data elements comprising a first portion and a second portion, a component for providing a second data element, the second data element corresponding to one of the plurality of first data elements and comprising a corrected version of the second portion of the corresponding first data element, a component for receiving an indication that none of the second portions of the plurality of first data elements match the second data element, and a component for providing, in response to the indication, a link associating the second data element with the first data element corresponding to the second data element.

In yet another aspect, a computer-readable medium on which is stored a set of instructions for providing corrected data, which when executed perform stages comprising receiving a plurality of first data elements, each of the plurality of first data elements comprising a first portion and a second portion, providing a second data element, the second data element corresponding to one of the plurality of first data elements and comprising a corrected version of the second portion of the corresponding first data element, receiving an indication that none of the second portions of the plurality of first data elements match the second data element, and providing, in response to the indication, a link associating the second data element with the first data element corresponding to the second data element.

In yet another aspect, a system for providing corrected data comprise means for receiving a plurality of first data elements, each of the plurality of first data elements comprising a first portion and a second portion, means for providing a second data element, the second data element corresponding to one of the plurality of first data elements and comprising a corrected version of the second portion of the corresponding first data element, means for receiving an indication that none of the second portions of the plurality of first data elements match the second data element, and means for providing, in response to the indication, a link associating the second data element with the first data element corresponding to the second data element.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with an embodiment of the present invention, a system for providing corrected data may comprise a component for receiving a plurality of first data elements, a component for providing a second data element, a component for receiving an indication, and a component for providing, in response to the indication, a link. Consistent with an embodiment of the present invention and referring to FIG. 1, the aforementioned components are included in a mailing system 100 which may comprise an address correcting system 185 used in conjunction with a delivery system 130 and a user device 175. The aforementioned devices and systems are exemplary and other devices and systems may comprise the aforementioned components and still be consistent with embodiment of the present invention. In addition, address correcting system 185 may be operated by an item delivery system operator or other entities or enterprises, for example.

Figure 1:
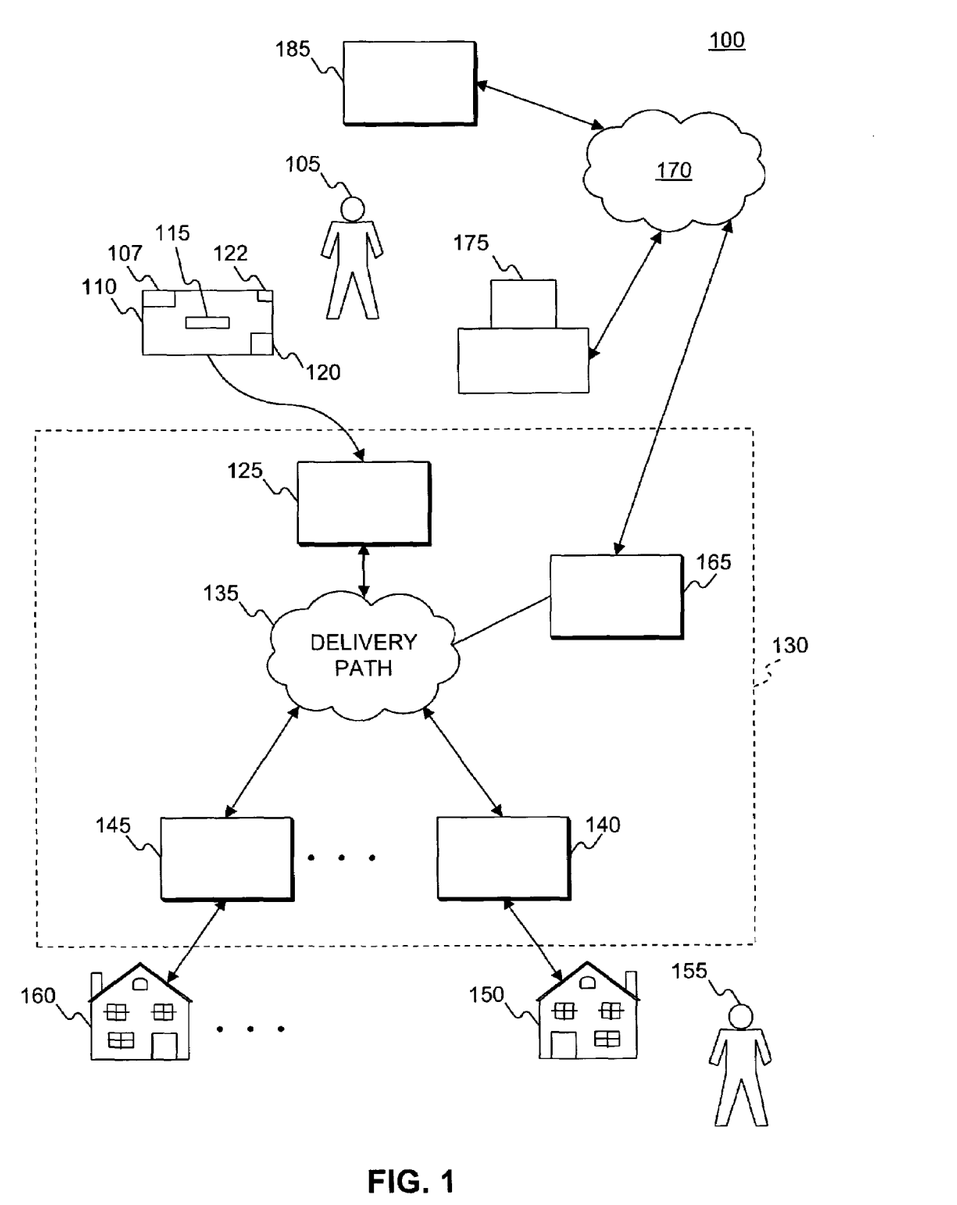
FIG. 1 is a functional block diagram of an exemplary item delivery system including an exemplary system for providing a corrected delivery address consistent with an embodiment of the present invention.

Mailing system 100 is shown in FIG. 1. For example, a sender 105 may place an item 110 into delivery system 130. Item 110 may contain a label 115 indicating a first address 150 of a recipient 155 and a return address 107 indicating where to return item 110 if necessary. Item 110 may also contain a tracking indicia 120 relating sender 105 and recipient 155. Tracking indicia 120 may be placed on item 110 by sender 105 or the delivery system operator. In addition, item 110 may include a delivery payment coding 122 that will be described in greater detail below. Elements of and data contained in return address 107, label 115, tracking indicia 120, and delivery payment coding 122 may be included together as one element or label, for example, on item 110.

Item 110 may be routed through delivery system 130, which may comprise a sender plant 125, a delivery path 135, a first address plant 140, an alternative address plant 145, and an alternative processing point 165. Delivery path 135 may comprise a plurality of plants similar to sender plant 125, first address plant 140, and alternative address plant 145. The plants within delivery path 135 may contain, among other things, automated systems and sorting equipment and are designed to receive and process a plurality of items. Delivery system 130 may be configured to sense tracking indicia 120 or delivery payment coding 122 placed on item 110 as it passes through the elements of delivery system 130 directing the movement of item 110 through delivery system 130. In addition to facilitating the tracking of item 110 through delivery system 130, tracking indicia 120 and delivery payment coding 122 may identify a sales transaction and relate recipient 155 and sender 105.

Item 110 may comprise a mailpiece, a United States Postal Service Priority Mail package, a United States Postal Service Express Mail Package, a United States Postal Service Global Express Mail Package, or a United States Postal Service Global Express Guarantee Package. Moreover, item delivery system 130 may comprise elements of the United States Postal Service.

Tracking indicia 120 and delivery payment coding 122 may comprise a bar code or a PLANET code, for example, but may also comprise any machine-readable or optically-scanable element. A bar code is a printed code used for recognition by a bar code scanner (reader). Traditional one-dimensional bar codes use the bar's width to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

Historically, system operators sorted flat mail using POSTNET, a 12-digit barcode consisting of alternating long and short bars indicating the destination of, for example, a mailpiece. Responding to the expanding needs of users, particularly heavy volume users, PLANET code was developed on the foundation of the existing technical infrastructure. The PLANET Code is the "opposite" of the current POSTNET codes, that is, reversing long bars for short and short bars for long. This innovation offers the convenience of a bar code that is easily applied using current bar-coding methods, and is readily scanned by the high-speed automation equipment already located in the plurality of plants comprising delivery system 130.

Item 110 may be sent through delivery system 130 by sender 105 to first address plant 140. At anytime in the delivery process a determination may be made as to whether item 110 is undeliverable. If it is determined that item 110 is undeliverable, item 110 may be forwarded to alternative processing point 165 where an ancillary service may be performed. Examples of such ancillary services are recycle service (treating item 110 as waste), NIXIE service, and Computerized Forwarding Service (CFS).

With respect to NIXIE service, NIXIE is a classification given to an item that cannot be sorted or is undeliverable-as-addressed because of an incorrect, illegible, or insufficient delivery address. If item 110 is undeliverable-as-addressed, address correction service (re-label with a correct address) or return service (return item to the sender) may be performed. In this case, a NIXIE operator specialized in the handling of such items is required. If item 110 requires return service, return address 107 on item 110 is read and item 110 is sent to return address 107 accordingly. Return address 107 is an element of item 110 that is usually placed in the upper left corner of item 110 to indicate the address of sender 105. This address indicates where sender 105 wants item 110 returned if it is undeliverable. In addition return address 107 may indicate where sender 105 will receive a bill for any fees due for the return of item 110. When item 110 requires address correction service, a NIXIE operator obtains the proper address of recipient 155 or the reason for non-delivery. While NIXIE processing may comprise address correction service or return service, those skilled in the art will appreciate that may other types of NIXIE processing may be performed.

Computerized forwarding service is a centralized, computerized address label-generating operation that forwards undeliverable-as-addressed items to recipients. In this case, recipient 155 may pre-register an alternative address 160 of recipient 155 with the delivery system operator in order to have all items forwarded to alternative address 160. For example, if recipient 155 moves and wishes to have items sent to alternative address 160, recipient 155 notifies the delivery system operator of alternative address 160. Once the delivery system operator is notified of alternative address 160, all items sent to first address 150 are detected by delivery system 130, re-labeled, and then forwarded to alternative address 160. In the aforementioned computerized forwarding service, items may be forwarded only for a specific period of time. The delivery system operator may expect recipient 155 to contact each and every sender who recipient 155 may expect to receive an item and notify the possible senders of the address change of recipient 155. After the computerized forwarding service time period is complete, the delivery system operator may cease forwarding items to recipient 155 and may return to the sender 105 all items sent to first address 150.

If ancillary services were required, item 110 may remain at alternative processing point 165 or may be processed at an item recovery section of alternative processing point 165. Item 110 may be recovered by sender 105 or recipient 155 upon the completion of a tracer. A tracer is a form completed by sender 105 or recipient 155 to locate delayed or undelivered items. While item recovery may occur at alternative processing point 165, those skilled in the art will appreciate that may other types of processing may be performed at alternative processing point 165.

While address correcting system 185 is shown to be separate from delivery system 130, the functionality of address correcting system 185 may be performed under the control of the delivery system operator at alternative processing point 165, at any point within delivery system 130, or at any point outside delivery system 130. Moreover, the functionality of address correcting system 185 may be performed by an enterprise not under the control of the delivery system operator.

As herein embodied and illustrated in FIG. 2, elements of system 100 comprising user device 175, communication system 170, and address correcting system 185 will be described in greater detail. User device 175 may comprise a personal computer or other similar microcomputer-based workstation. It can be appreciated, however, that user device 175 may comprise any type of computer operating environment such as hand-held devices, multiprocessor systems, microprocessor-based or programmable sender electronics, minicomputers, mainframe computers, and the like. User device 175 may also be practiced in distributed computing environments where tasks are performed by remote processing devices. Furthermore, user device 175 may comprise a mobile terminal such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and user device 175 may comprise other systems or devices.

A PDA is a handheld computer that serves as an organizer for personal information. It generally includes at least a name and address database, to-do list and note taker. PDAs are typically pen-based and use a stylus ("pen") to tap selections on menus and to enter printed characters. The unit may also include a small on-screen keyboard which is tapped with the pen. Data may be synchronized between the PDA and a desktop computer through a cable or wireless transmissions.

WAP is a standard for providing cellular phones, pagers and other handheld devices with secure access to e-mail and text-based Web pages. It provides a complete environment for wireless applications that includes a wireless counterpart of TCP/IP and a framework for telephony integration such as call control and phone book access. Wireless Markup Language (WML), which is a streamlined version of HTML for small screen displays, is featured in WAP. WAP uses WMLScript, a compact language that runs in limited memory, and supports handheld input methods such as keypads and voice recognition. In addition, WAP is independent of the air interface and runs over all the major wireless networks. Moreover, it is also device independent, requiring only a minimum functionality in the unit so that it can be used with many different phones and handheld devices.

User device 175 may be located in a home, office, store, an item delivery counter within a store, a retail center kiosk, an item delivery system office, or any location wherein it may be operated. Moreover, user device 175 may be operated by sender 105 that may comprise a subject, a technician, an advisor, a sales consultant, a sales person, or any other person. It can be appreciated that user device 175 may be located at a variety of places and operated by a variety of people.

Communication system 170 may comprise, for example, a local area network (LAN) or a wide area network (WAN). Such networking environments are commonplace in offices, enterprise-wide computer networks, intranets, and the Internet, and are known by those skilled in the art. When a LAN is used as communication system 170, user device 175 and elements of address correcting system 185 may be connected to communication system 170 through a network interface located at each of the respective user device 175 and elements of address correcting system 185. When a WAN networking environment is utilized as communication system 170, user device 175 and elements of address correcting system 185 typically include an internal or external modem (not shown) or other means for establishing communications over the WAN, such as the Internet.

In addition to utilizing a wire line communications system as communication system 170, a wireless communications system, or a combination of wire line and wireless may be utilized as communication system 170 in order to, for example, exchange web pages via the internet, exchange e-mails via the Internet, or for utilizing other communications channels. Wireless can be defined as radio transmission via the airwaves, however, those skilled in the art will appreciate that various other communication techniques can be used to provide wireless transmission including infrared line of sight, cellular, microwave, satellite, packet radio and spread spectrum radio. User device 175 and elements of address correcting system 185 in the wireless environment can be any mobile terminal such as a cellular phone, personal digital assistant (PDA), intelligent pager, portable computer, hand held computer, or any device capable of receiving wireless data. Wireless data may include, but is not limited to, paging, text messaging, e-mail, Internet access and other specialized data applications specifically excluding or including voice transmission.

In utilizing communication system 170, data sent over communication system 170 may be encrypted to insure data security. When encrypting, the data may be converted into a secret code for transmission over a public network. The original file, or "plaintext," may be converted into a coded equivalent called "ciphertext" via an encryption algorithm executed, for example, on user device 175 or on elements of address correcting system 185. The ciphertext is decoded (decrypted) at a receiving end and turned back into plaintext.

The encryption algorithm may use a key, which is a binary number that is typically from 40 to 128 bits in length. The greater the number of bits in the key (cipher strength), the more possible key combinations and the longer it would take to break the code. The data is encrypted, or "locked," by combining the bits in the key mathematically with the data bits. At the receiving end, the key is used to "unlock" the code and restore the original data.

There are two main cryptographic methods that may be suitable for use with system 100. The traditional method uses a secret key, such as the Data Encryption Standard (DES). In DES, both sender and receiver use the same key to encrypt and decrypt. This is the fastest method, but transmitting the secret key to the recipient in the first place is not secure. The second method is public-key cryptography, such as the Rivest-Shamir-Adleman (RSA) highly-secure cryptography method by RSA Data Security, Inc., Redwood City, Calif., (www.rsa.com). RSA uses a two-part concept with both a private and a public key. The private key is kept by the owner; the public key is published. Each recipient has a private key that is kept secret and a public key that is published for everyone. The sender looks up the recipient's public key and uses it to encrypt the message. The recipient uses the private key to decrypt the message. Owners never have a need to transmit their private keys to anyone in order to have their messages decrypted, thus the private keys are not in transit and are not vulnerable.

Public key cryptography software marketed under the name Pretty Good Privacy (PGP) from Pretty Good Privacy, Inc., (PGP) of San Mateo, Calif., (www.pgp.com) may be utilized in this embodiment. PGP was developed by Phil Zimmermann, founder of the company, and it is based on the RSA cryptographic method. A version for personal, non-business use is available on various Internet hosts. While PGP may be used to encrypt data transmitted over communication system 170, it is exemplary and many other types of encryption algorithms, methods and schemes may be employed.

In system 100, data may be transmitted by methods and processes other than, or in combination with communication system 170. These methods and processes may include, but are not limited to, transferring data via, diskette, CD ROM, facsimile, conventional mail, an interactive voice response system (IVR), or via voice over a publicly switched telephone network. An IVR is an automated telephone answering system that responds with a voice menu and allows the user to make choices and enter information via the telephone keypad. IVR systems are widely used in call centers as well as a replacement for human switchboard operators. An IVR system may also integrate database access and fax response.

Figure 3:
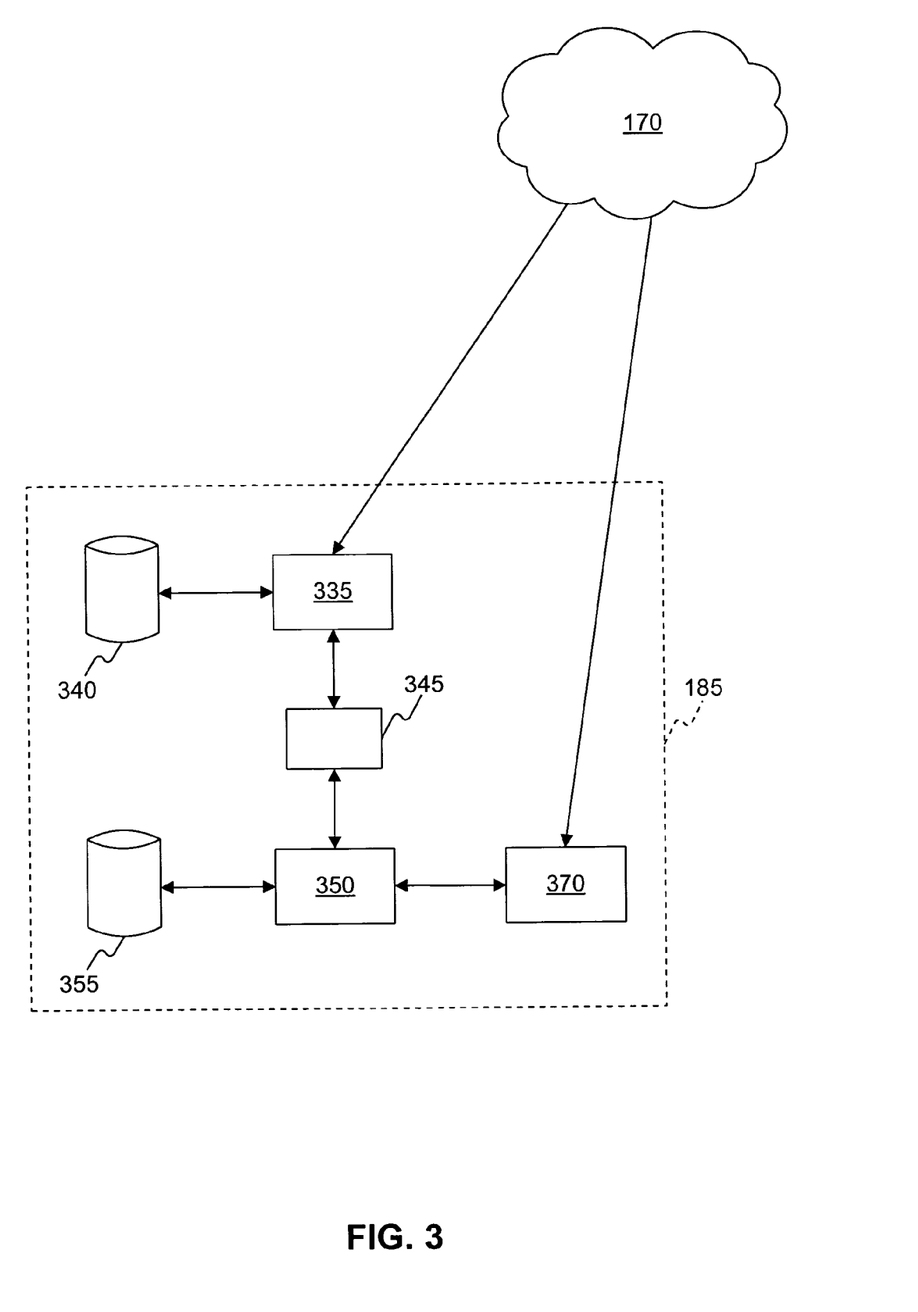
FIG. 3 is a functional block diagram of an exemplary system for providing a corrected delivery address consistent with an embodiment of the present invention.

Referring to FIG. 3, exemplary address correcting system 185 may comprise a first server front end 335 with its associated first server front end database 340, a first server back end 350 with its associated first server back end database 355, and a simple mail transfer protocol (SMTP) server 370. This particular architecture of address correcting system 185 is exemplary, and that many other types of systems or architectures may be employed to implement address correcting system 185.

In exemplary address correcting system 185, first server front end 335 is separated from first server back end 350 by a first server firewall 345. One function of first server front end 335 is to provide an interface via communication system 170 between user device 175 and address correcting system 185. The function of the SMTP server 370 is to provide, for example, an e-mail interface via communication system 170 between user device 175 and address correcting system 185.

Simple mail transfer protocol is a standard e-mail protocol on the Internet. It is a TCP/IP protocol that defines the message format and the message transfer agent (MTA), which stores and forwards the mail. SMTP was originally designed for only ASCII text, but MIME and other encoding methods enable program and multimedia files to be attached to e-mail messages. SMTP servers route SMTP messages throughout the Internet to a mail server, such as a Post Office Protocol 3 (POP3) or an Internet Messaging Access Protocol (IMAP) server, which provides a message store for incoming mail.

Post Office Protocol 3 (POP3) servers, using the SMTP messaging protocol, are standard mail servers commonly used on the Internet. POP3 servers provide a message store that holds incoming e-mail until users log on and download them. With POP3, all pending messages and attachments are downloaded at the same time. Internet Messaging Access Protocol (IMAP) is also a standard mail server that is widely used on the Internet. It provides a message store that holds incoming e-mail until users log on and download them. IMAP, however, is more sophisticated than the POP3 mail server. In IMAP, messages can be archived in folders, mailboxes can be shared, and a user can access multiple mail servers. There is also better integration with MIME, which is used to attach files. For example, users can read only the headers in the message without having to automatically accept and wait for unwanted attached files to download.

First server front end 335 and first server back end 350 may comprise a personal computer or other similar microcomputer-based workstations. Those skilled in the art, however, will appreciate that first server front end 335 and first server back end 350 may comprise any type of computer operating environment such as hand-held devices, multiprocessor systems, microprocessor-based or programmable sender electronics, minicomputers, mainframe computers, and the like. First server front end 335 and first Server back end 350 may also be practiced in distributed computing environments where tasks are performed by remote processing devices. Specifically, embodiments of first server front end 335 may utilize a COMPAQ PROLIANT 1600 server running WINDOWS 2000 and DOMINO Webserver. Similarly, first server back end 350 may be implemented on a COMPAQ PROLIANT 1600 server running NT4 and DOMINO Application Server. SMTP server 370 may be implemented on a COMPAQ DL 360 running WINDOWS 2000 and DOMINO SMTP Mail Server.

Figure 2:
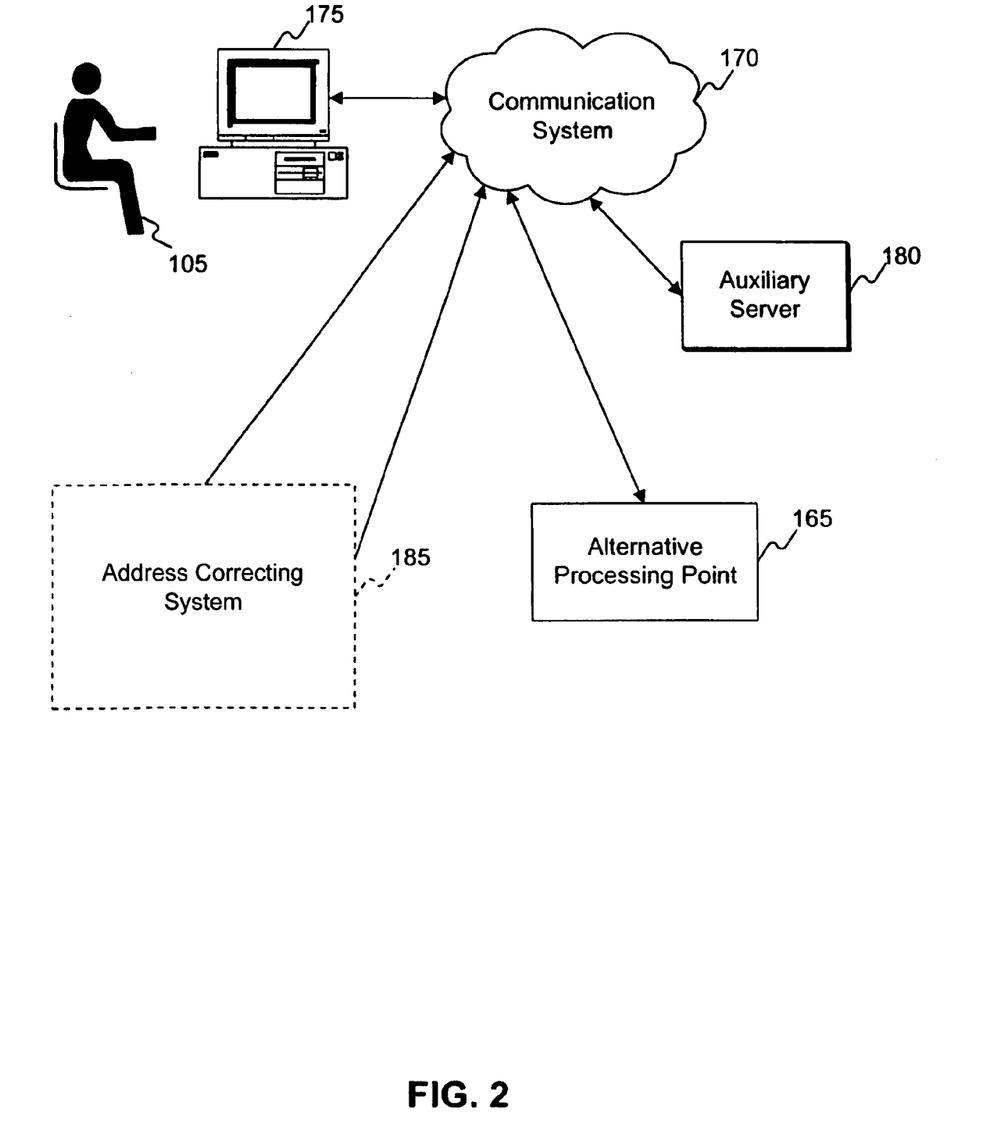
FIG. 2 is a functional block diagram of an exemplary system for providing a corrected delivery address consistent with an embodiment of the present invention.

Other servers, such as an auxiliary server 180 shown in FIG. 2, may be included in system 100. Other servers used in system 100 may be constructed in an architecture similar to address correcting system 185 or may be constructed using other suitable architectures.

Figure 4:
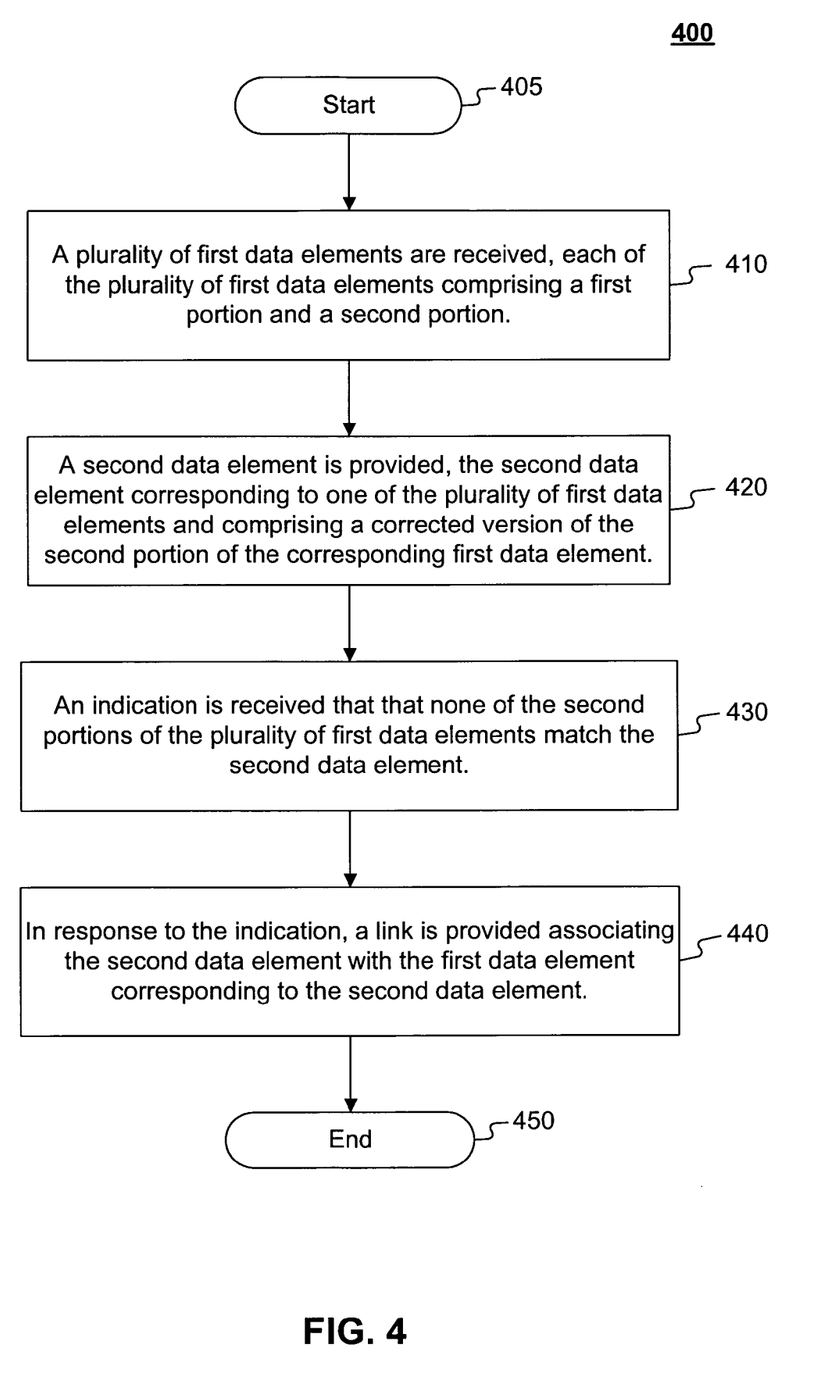
FIG. 4 is a flow chart of an exemplary method for providing a corrected delivery address consistent with an embodiment of the present invention.

FIG. 4 is a flow chart setting forth the general stages involved in exemplary method 400 for providing corrected data comprising, for example, a corrected delivery address. The implementation of the stages of exemplary method 400 in accordance with an exemplary embodiment of the present invention will be described in greater detail below. Exemplary method 400 begins at starting block 405 and proceeds to stage 410 where a plurality of first data elements are received. Each of the plurality of first data elements may comprise a first portion and a second portion. For example, the plurality of first data elements may respectively correspond to a plurality of items, similar to item 110, configured to be delivered in item delivery system 130. The plurality of first data elements may be respectively indicated on the exterior of the plurality of items in, for example, tracking indicia 120, and may be machine readable or optically scanable by elements within item delivery system 130. Specifically, the plurality of first data elements may be respectively indicated on the exterior of the plurality of items using a bar code or a PLANET code as described above.

Figure 5:
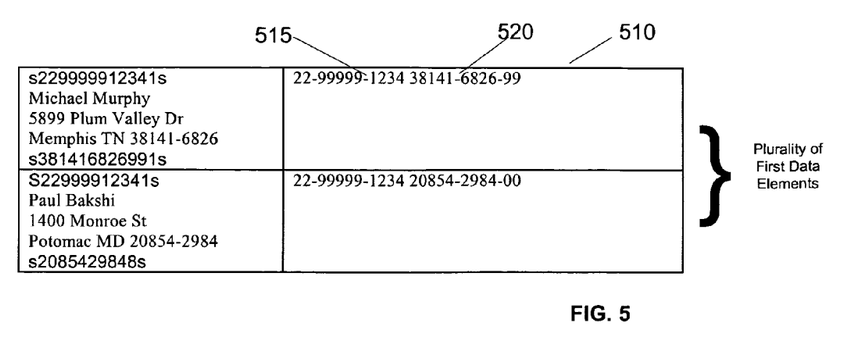
FIG. 5 illustrates a plurality of first data elements consistent with an embodiment of the present invention.

Referring now to FIG. 5, a first data element 510 may comprise a first portion 515 and a second portion 520. First portion 515 may be represented numerically and may identify a sender, for example. Second portion 520 may also be represented numerically and may identify a recipient address, for example, a "ZIP-plus-4" code corresponding to first address 150 to which the sender wishes to send item 110. A person sending the plurality of items may, for example, provide the delivery system operator the data shown in FIG. 5 using network 170, regular mail, e-mail, facsimile, internet, an interactive voice response system, or any other process for sending data.

From stage 410 (FIG. 4) where the plurality of first data elements are received, exemplary method 400 continues to stage 420 where a second data element is provided, the second data element corresponding to one of the plurality of first data elements and comprising a corrected version of second portion 520 of the corresponding first data element 510. For example, the second data element may identify a corrected recipient address of an item, for example, alternative address 160 of recipient 155.

Figure 6:
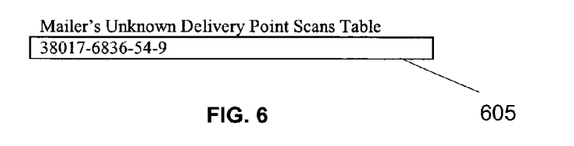
FIG. 6 illustrates a second data element consistent with an embodiment of the present invention.
Figure 7:
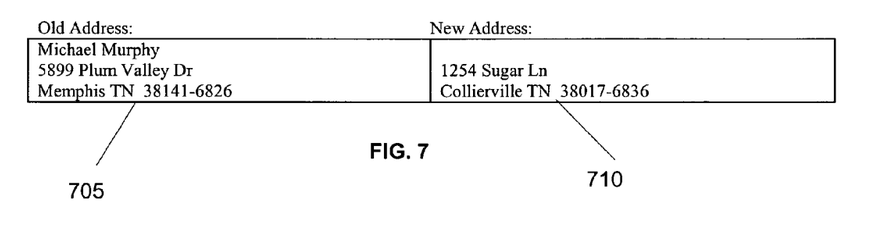
FIG. 7 is illustrates an old address and a new address consistent with an embodiment of the present invention.
Figure 8:
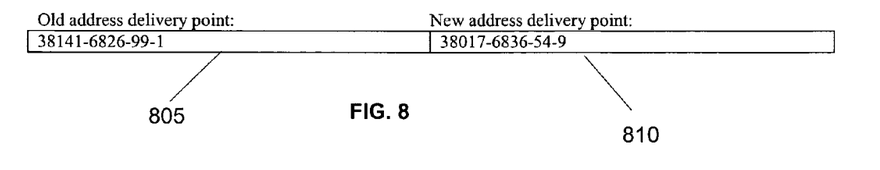
FIG. 8 illustrates a link associating the second data element with the first data element consistent with an embodiment of the present invention.

Referring now to FIG. 6, A second data element 605 may be represented numerically and may identify a "ZIP-plus-4" code corresponding to a correct recipient address. Second data element 605 may identify an address corrected by the delivery system operator as described above with respect to alternative processing point 165. For example, alternative processing point 165 may provide a corrected address comprising alternative address 160 for example, by performing an ancillary service such as a Computerized Forwarding Service (CFS), as described above. FIG. 7 illustrates an incorrect address 705 and a correct address 710, which may represent a corrected version of incorrect address 705. The delivery system operator may provide the sender second data element 605 using network 170, regular mail, e-mail, facsimile, internet, an interactive voice response system, or any other process for sending data.

Once the second data element is provided in stage 420 (FIG. 4), exemplary method 400 advances to stage 430 where an indication is received that none of the second portions of the plurality of first data elements match second data element 605. For example, the sender may not know that one of the addresses to which one of the plurality of items was sent is incorrect. Furthermore, the deliver system operator may not want to provide the sender complete access to all its address correction data. Accordingly, the delivery system operator may provide the sender data including a corrected address comprising second data element 605 for example. Once received, the sender may review all the addresses that the plurality of items were to be delivered to and may determine that the address indicated by second data element 605 was not provided to the delivery system operator in stage 410, for example, and may comprise a corrected address. However, from the information on hand, the sender may not be able determine which of the plurality of items to associate with the corrected address indicated by second data element 605. In order to alleviate this problem, the sender may send to the delivery system operator an indicator. This indicator may comprise the corrected address indicated by second data element 605 and a list of all the addresses that the plurality of items were to be delivered comprising the plurality of first data elements, for example.

After the indication is received in stage 430, exemplary method 400 proceeds to stage 440 where, in response to the indication, a link is provided associating the second data element with the first data element corresponding to the second data element. For example, once the delivery system operator receives from the sender the corrected address indicated by second data element 605 and the list of all the addresses that the plurality of items were to be delivered, the delivery system operator may create a link. A link may be created by knowing, for example, all of a new side 11 digit addresses and all of an old side 11 digit addresses that moved to the new location. The delivery system operator, comprising the USPS for example, may have the proprietary National Change of Address Database where the old and new 11 digit Delivery Point Barcode information resides. The USPS, for example, can take the old 11 digits (the unknown scans to the mailer) and have a look up table that would reveal a Secure Hash Algorithm ("SHA") of 4 characters of a person's name and the 11 digit of the original mailing address. This condensed version of the person's name and original mailing address allows for verification of data access, since the mailer then only has to compare the revealed SHA with a SHA of his mailing list to link the two 11 digit's together. By only revealing a SHA, instead of the mailed to 11 digit, the new information may only be provided to someone who has authorized it, by virtue of having the name and old address, for example.

In creating the link, the delivery system operator may use other data available to them and link the corrected address indicated by second data element 605 to one the addresses that the plurality of items were to be delivered. As a security check, the delivery system operator my confirm that the recipient indicated by the sender as having the old incorrect address is also the recipient the delivery system operator has in their records and having the new address. Once the link is created, it may be sent to the sender. Once received, the sender may use to link to update their records. From stage 440 where link is provided, exemplary method 400 ends at stage 450.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method for providing corrected data, the method comprising:

receiving a plurality of first data elements, each of the plurality of first data elements comprising a first portion and a second portion;

providing a second data element, the second data element corresponding to one of the plurality of first data elements and comprising a corrected version of the second portion of the corresponding first data element;

comparing the plurality of first data elements to the second data element;

receiving an indication that none of the second portions of the plurality of first data elements match the corrected version of the second portion of the second data element;

in response to the indication, producing a first set of condensed versions of the plurality of first data elements and comparing the first set of condensed versions to a proprietary database comprising a second set of condensed versions of a second plurality of first data elements and corresponding plurality of second data elements;

verifying that at least one of the condensed versions of the first set matches at least one of the condensed versions of the second set; and providing, based on the verifying, a link associating the second data element with the first data element.

2. The method of claim 1, wherein the plurality of first data elements respectively correspond to a plurality of items configured to be delivered in an item delivery system.

3. The method of claim 2, wherein the plurality of first data elements are respectively indicated on the exterior of the plurality of items and are machine readable.

4. The method of claim 2, wherein the plurality of first data elements are respectively indicated on the exterior of the plurality of items and are optically scanable.

5. The method of claim 2, wherein the plurality of first data elements are respectively indicated on the exterior of the plurality of items using at least one of a bar code or a PLANET code.

6. The method of claim 2, wherein the item delivery system comprises the United States Postal Service.

7. The method of claim 2, wherein the plurality of items comprises at least one of a mailpiece, a United States Postal Service Priority Mail package, a United States Postal Service Express Mail Package, a United States Postal Service Global Express Mail Package, or a United States Postal Service Global Express Guarantee Package.

8. The method of claim 1, wherein the first portion identifies a sender of an item.

9. The method of claim 1, wherein the second portion identifies a recipient address of an item.

10. The method of claim 1, wherein the second data element identifies a corrected recipient address of an item.

11. The method of claim 1, wherein at least one of receiving the plurality of first data elements, providing the second data element, receiving the indication, or providing, in response to the indication, the link, further comprises utilizing at least one of regular mail, e-mail, facsimile, internet, or an interactive voice response system.

12. The method of claim 1, wherein at least one of receiving the plurality of first data elements, providing the second data element, receiving the indication, and providing, in response to the indication, the link, further comprises communicating over a network.

13. A system for providing corrected data, the system comprising:

a first component for receiving a plurality of first data elements, each of the plurality of first data elements comprising a first portion and a second portion;

a second component for providing a second data element, the second data element corresponding to one of the plurality of first data elements and comprising a corrected version of the second portion of the corresponding first data element;

a third component for comparing the plurality of first data elements to the second data elements;

a fourth component for:

receiving an indication that none of the second portions of the plurality of first data elements match the corrected version of the second portion of the second data element;

producing a first set of condensed versions of the plurality of first data elements;

comparing the first set of condensed versions to a proprietary database comprising a second set of condensed versions of a second plurality of first data elements and corresponding plurality of second data elements; and verifying that at least one of the condensed versions of the first set matches at least one of the condensed versions of the second set; and a component for providing, based on the verifying, a link associating the second data element with the first data element.

14. The system of claim 13 wherein the plurality of first data elements respectively correspond to a plurality of items configured to be delivered in an item delivery system.

15. The system of claim 14, wherein the plurality of first data elements are respectively indicated on the exterior of the plurality of items and are machine readable.

16. The system of claim 14, wherein the plurality of first data elements are respectively indicated on the exterior of the plurality of items and are optically scanable.

17. The system of claim 14, wherein the plurality of first data elements are respectively indicated on the exterior of the plurality of items using at least one of a bar code or a PLANET code.

18. The system of claim 14, wherein the item delivery system comprises the United States Postal Service.

19. The system of claim 14, wherein the plurality of items comprises at least one of a mailpiece, a United States Postal Service Priority Mail package, a United States Postal Service Express Mail Package, a United States Postal Service Global Express Mail Package, or a United States Postal Service Global Express Guarantee Package.

20. The system of claim 13, wherein the first portion identifies a sender of an item.

21. The system of claim 13, wherein the second portion identifies a recipient address of an item.

22. The system of claim 13, wherein the second data element identifies a corrected recipient address of an item.

23. The system of claim 13, wherein at least one of the component for receiving the plurality of first data elements, the component for providing the second data element, the component for receiving the indication, or the component for providing, in response to the indication, the link, is further configured for utilizing at least one of regular mail, e-mail, facsimile, internet, or an interactive voice response system.

24. The system of claim 13, wherein at least one of the component for receiving the plurality of first data elements, the component for providing the second data element, the component for receiving the indication, or the component for providing, in response to the indication, the link, is further configured for communicating over a network.

25. A program on a computer-readable medium encoded with a set of instructions for providing corrected data, which, when executed by a computer, perform stages comprising:

receiving a plurality of first data elements, each of the plurality of first data elements comprising a first portion and a second portion;

providing a second data element, the second data element corresponding to one of the plurality of first data elements and comprising a corrected version of the second portion of the corresponding first data element;

comparing the plurality of first data elements to the second data element;

receiving an indication that none of the second portions of the plurality of first data elements match the corrected version of the second portion of the second data element;

in response to the indication, producing a first set of condensed versions of the plurality of first data elements and comparing the first set of condensed versions to a proprietary database comprising a second set of condensed versions of a second plurality of first data elements and corresponding plurality of second data elements;

verifying that at least one of the condensed versions of the first set matches at least one of the condensed versions of the second set; and providing, based on the verifying, a link associating the second data element with the first data element.

26. The program on the computer-readable medium of claim 25, wherein the plurality of first data elements respectively correspond to a plurality of items configured to be delivered in an item delivery system.

27. The program on the computer-readable medium of claim 26, wherein the plurality of first data elements are respectively indicated on the exterior of the plurality of items and are machine readable.

28. The program on the computer-readable medium of claim 26, wherein the plurality of first data elements are respectively indicated on the exterior of the plurality of items and are optically scanable.

29. The program on the computer-readable medium of claim 26, wherein the plurality of first data elements are respectively indicated on the exterior of the plurality of items using at least one of a bar code or a PLANET code.

30. The program on the computer-readable medium of claim 26, wherein the item delivery system comprises the United States Postal Service.

31. The program on a computer-readable medium of claim 26, wherein the plurality of items comprises at least one of a mailpiece, a United States Postal Service Priority Mail package, a United States Postal Service Express Mail Package, a United States Postal Service Global Express Mail Package, or a United States Postal Service Global Express Guarantee Package.

32. The program on the computer-readable medium of claim 25, wherein the first portion identifies a sender of an item.

33. The program on the computer-readable medium of claim 25, wherein the second portion identifies a recipient address of an item.

34. The program on the computer-readable medium of claim 25, wherein the second data element identifies a corrected recipient address of an item.

35. The program on the computer-readable medium of claim 25, wherein at least one of receiving the plurality of first data elements, providing the second data element, receiving the indication, or providing, in response to the indication, the link, further comprises utilizing at least one of regular mail, e-mail, facsimile, internet, or an interactive voice response system.

36. The program on the computer-readable medium of claim 25, wherein at least one of receiving the plurality of first data elements, providing the second data element, receiving the indication, or providing, in response to the indication, the link, further comprises communicating over a network.

37. A system for providing corrected data, the system comprising:

means for receiving a plurality of first data elements, each of the plurality of first data elements comprising a first portion and a second portion;

means for providing a second data element, the second data element corresponding to one of the plurality of first data elements and comprising a corrected version of the second portion of the corresponding first data element;

means for comparing the plurality of first data elements to the second data elements;

means for:
receiving an indication that none of the second portions of the plurality of first data elements match the corrected version of the second portion of the second data element;

producing a first set of condensed versions of the plurality of first data elements;

comparing the first set of condensed versions to a proprietary database comprising a second set of condensed versions of a second plurality of first data elements and corresponding plurality of second data elements; and verifying that at least one of the condensed versions of the first set matches at least one of the condensed versions of the second set; and means for providing, based on the verifying, a link associating the second data element with the first data element.

38. The system of claim 37 wherein the plurality of first data elements respectively correspond to a plurality of items configured to be delivered in an item delivery system.

39. The system of claim 38, wherein the plurality of first data elements are respectively indicated on the exterior of the plurality of items and are machine readable.

40. The system of claim 38, wherein the plurality of first data elements are respectively indicated on the exterior of the plurality of items and are optically scanable.

41. The system of claim 38, wherein the plurality of first data elements are respectively indicated on the exterior of the plurality of items using at least one of a bar code or a PLANET code.

42. The system of claim 38, wherein the item delivery system comprises the United States Postal Service.

43. The system of claim 38, wherein the plurality of items comprises at least one of a mailpiece, a United States Postal Service Priority Mail package, a United States Postal Service Express Mail Package, a United States Postal Service Global Express Mail Package, or a United States Postal Service Global Express Guarantee Package.

44. The system of claim 37, wherein the first portion identifies a sender of an item.

45. The system of claim 37, wherein the second portion identifies a recipient address of an item.

46. The system of claim 37, wherein the second data element identifies a corrected recipient address of an item.

47. The system of claim 37, wherein at least one of the means for receiving the plurality of first data elements, the means for providing the second data element, the means for receiving the indication, or the means for providing, in response to the indication, the link, is further configured for utilizing at least one of regular mail, e-mail, facsimile, internet, or an interactive voice response system.

48. The system of claim 37, wherein at least one of the means for receiving the plurality of first data elements, the means for providing the second data element, the means for receiving the indication, or the means for providing, in response to the indication, the link, is further configured for communicating over a network.

* * * * *